United States Patent [19]
Tomazic

[11] Patent Number: 5,716,733
[45] Date of Patent: Feb. 10, 1998

[54] METHOD FOR PRODUCING A NONDETACHABLE, FLUID-TIGHT, AND GASTIGHT CONNECTION BETWEEN A PLATE STACK AND A LATERAL COMPONENT OF AN ELECTROCHEMICAL BATTERY AND FOR SPACING ELECTRODE PLATES, AS WELL AS AN ELECTROCHEMICAL BATTERY

[75] Inventor: Gerd Tomazic, Murzzuschlag, Austria

[73] Assignee: Elin EBG Elektrotechnik GmbH, Vienna, Australia

[21] Appl. No.: 617,757

[22] PCT Filed: Sep. 14, 1994

[86] PCT No.: PCT/AT94/00128

§ 371 Date: Mar. 15, 1996

§ 102(e) Date: Mar. 15, 1996

[87] PCT Pub. No.: WO95/08198

PCT Pub. Date: Mar. 23, 1995

[30] Foreign Application Priority Data

Sep. 17, 1993 [AT] Austria ..................... 1893/93

[51] Int. Cl.⁶ .................................................. H01M 2/18
[52] U.S. Cl. ........................................ 429/130; 29/623.4
[58] Field of Search ........................... 29/623.2, 623.4; 429/130, 139

[56] References Cited

U.S. PATENT DOCUMENTS 5,197,994  3/1993  Brocksmith ................. 29/623.2

FOREIGN PATENT DOCUMENTS 0327528  8/1989  European Pat. Off. .
0479765  9/1991  European Pat. Off. .
3408373  6/1986  Germany .

OTHER PUBLICATIONS

PCT Search Report Dec. 28, 1994.

Japanese abstract No. JP59,138,068 Dec. 7, 1984.

Austrian Office Action Jul. 28, 1994.

*Primary Examiner*—Stephen Kalafut
*Attorney, Agent, or Firm*—Greenblum & Bernstein, P.L.C.

[57] ABSTRACT

The invention concerns a method for producing a nondetachable, fluid-tight, and gastight connection between a plate stack (1) and a plate-shaped lateral component (3) of an electrochemical battery, and for spacing this plate stack (1), which is comprised of successive, thin-walled electrode plates with separator plates (4) disposed between each of them; the lateral component (3) is comprised of electrically non-conducting material. According to the invention, the lateral component (3) is guided spaced apart from and parallel to the respective face ends (5) of the electrode plates and separator plates (4) of the plate stack (1). Then the region of the face ends (5) and the side of the lateral component (3) oriented toward the plate stack (1) are simultaneously exposed to a temporary surface heating until they reach melting temperature and are then pressed against each other until the material cools.

7 Claims, 1 Drawing Sheet

METHOD FOR PRODUCING A NONDETACHABLE, FLUID-TIGHT, AND GASTIGHT CONNECTION BETWEEN A PLATE STACK AND A LATERAL COMPONENT OF AN ELECTROCHEMICAL BATTERY AND FOR SPACING ELECTRODE PLATES, AS WELL AS AN ELECTROCHEMICAL BATTERY

CROSS REFERENCE TO RELATED APPLICATIONS

The present application claims the priority under 35 U.S.C. § 119 of Austrian Patent Application No. 1893/93 filed on Sep. 17, 1993.

BACKGROUND OF THE INVENTION

1. Field of the Invention

The invention relates to a method for producing a nondetachable, fluid-tight, and gastight connection between a plate stack and a plate-shaped lateral component of an electrochemical battery and for spacing this plate stack, which is comprised of successive, thin-walled electrode plates, with separator plates disposed between each of them, wherein the lateral component is comprised of electrically non-conducting material; the invention also relates to an electrochemical battery, in particular a zinc-bromine battery, with a plate-shaped lateral component, which is comprised of electrically non-conducting material.

2. Discussion of Background Information

Zinc-bromine batteries are constructed of bipolar electrode plates, which are comprised of plastic-bonded carbon. The individual electrode plates are separated by smooth separator plates made of plastic. Because the electrode plates and/or separator plates are made with reinforced plastic lateral edges, intermediate electrode compartments and concrete anode and cathode regions are produced between each electrode plate and separator plate.

The electrolytes, that is anolyte and catholyte, are each routed as separate circuits and are conveyed in and out of the anode or cathode regions via lateral distribution tunnels. A separate electrolyte reservoir along with a pump is provided for each of the two electrolyte circuits.

Particular attention must be paid to the chemical resistance of the plastics used because of the high reactivity of bromine. At the same time, it is important that the face regions of the electrode plates and separator plates, which constitute the closing of the above-mentioned anode and cathode regions, are closed in both a fluid-tight and gastight manner.

A further problem in bromine-zinc batteries is comprised of the fact that with their plate stacks, which are produced by the layering of a large number of electrode plates and separator plates upon one another, the tolerances of the plate thickness accumulate so that after the conclusion of the final plate positioning, it is difficult to assure a precise agreement with the inlet and outlet openings for the connection of the circulating system which conveys the electrolytes.

There is a known method in which the face regions of the electrode plates and separator plates are glued together.

In actual use, though, it has turned out that, no impermeability can be assured with this method.

It has furthermore been suggested that the connection of the face regions be carried out by screw connection of a plate-shaped lateral part, which is provided with a seal, wherein the screws engage directly in the face end region. It is therefore also not possible to prevent an escape of the electrolyte, chiefly because of distortions of the seal.

Furthermore, a process is employed, which is comprised in heating a plate-shaped thermoplastic component and the face regions of the electrode plates and separator plates by means of contact with a heating element and then pressing the component against the face ends. The connections formed using this process can only assure fluid-tightness and gastightness for a very limited period of time.

The problem of impermeability could in fact be improved by extruding side walls on the plate stack, which is comprised of electrode plates and separator plates; however, the disadvantage arises that a distortion of the lateral edges and consequently also of the electrode plates and separator plates occurs.

Moreover, it is disadvantageous that after completion of the extruded side walls, through openings must be made in another work cycle, which are for connecting the electrolyte lines to the anode and cathode regions. As a result of the face region distortions produced in extrusion, it is not always possible to place the through openings precisely enough so that large-scale material failures occur.

In extrusion, the imprecisions of the plate spacings produced furthermore result in a shortening of service life, deviations from the designed nominal capacity, and a more rapid drop in power of the battery.

The patent publication EP, A, 0 327 528 deals with a metal-halogen battery, in particular a zinc-bromine battery. This battery has a large number of smooth, if need be bipolar, electrodes between which smooth separators are disposed, which are connected, in particular welded, to one another on their edges. In this manner, anode and cathode regions are formed, each with at least one inflow and outflow opening; electrolyte fluids can be carried through these regions from two supply vessels which have electrolyte circuits which are separate from each other. As a result, on their edge regions, the electrodes have an at least partially continuous tapering, and the separators, on their edge region which rests against the edge regions of the electrodes, have an at least partially continuous thickening. The largest span of the enlargement of the separator is greater than the smallest span of the tapering of the electrode.

In Patent Abstracts of Japan, vol. 8, no. 268 (E-268), Dec. 7, 1984, a summary deals with Japanese patent JP, A, 59 138 068. This summary tells about the manufacture of an electrode plate for a zinc-bromine secondary battery.

A first and second electrode, which are comprised of two metallic nets, are disposed between a first and second carbon-plastic plate. A first plastic plate, which constitutes a micro channel, and a second plastic plate, which constitutes an outer frame, are disposed on the outside of the first carbon-plastic plate. A third plastic plate, which is comprised of the same material as the second plastic plate, is attached to the outside of the second carbon-plastic plate. Then, the plates are joined to each other by being heated and pressed against each other. In this manner, an electrode is formed for a zinc-bromine battery.

As a result of heating, the first and second carbon-plastic plates melt, the melted material penetrates the mesh of the metallic nets and then the first and second carbon-plastic plates and the first and second electrodes are joined to one another by compression. Thus the electric resistance between the plates is reduced and the current flow is distributed evenly between the electrodes.

The prime purpose of this invention is thus comprised of increasing the efficiency of a zinc-bromine secondary battery by reducing the internal resistance of an electrode plate.

With the inventions according to publications EP, A, 0 327 528 and JP, A, 59 138 068, it is not possible to produce a nondetachable, fluid-tight, and gastight connection between a plate stack and a lateral component of a chemical battery and to carry out a spacing of electrode plates.

SUMMARY OF THE INVENTION

The object of the invention is to construct a lateral component and a method for connecting it to the plate packet, by means of which a precise final positioning of the electrode plates and separator plates in relation to each other is assured as well as fluid-tightness and gastightness of the plate stack in relation to the outside, and also to design an electrochemical battery which is provided with this lateral component.

The object is attained by the invention. This is characterized in that the lateral component is guided spaced apart from and parallel to the respective face ends of the electrode plates and separator plates of the plate stack, and then the region of the face ends and the side of the lateral component oriented toward the plate stack are simultaneously exposed to a temporary surface heating until they reach melting temperature and then are pressed against each other until the material cools.

This is advantageous because as a result, most of the crystallinity of the thermoplastic materials is preserved.

In one embodiment of the invention, the heating of the side of the lateral component oriented toward the plate stack and of the region of the face ends of the electrode plates and separator plates is carried out by means of a joining and welding process.

The advantage resulting from this is the possibility of an uncomplicated adaptation of already existing welding devices for employing the method according to the invention.

An improvement of the invention provides that the heating of the side of the lateral component oriented toward the plate stack and of the region of the face ends of the electrode plates and separator plates is carried out by means of the heat reflector (panel) butt-welding process, wherein the face ends and the side of the lateral component oriented toward the plate stack are pressed against a heat reflector (panel), which is temporarily inserted between the lateral component and the plate stack, until they reach melting temperature and then, after removal of the heat reflector, the lateral component and the face ends are pressed against each other until the material cools.

Therefore the connection quality between lateral component and plate stack is advantageously further increased.

In a particular embodiment of the invention, the heating of the lateral component (3) and of the region of the face ends of the electrode plates and separator plates is carried out by means of the heat reflector butt-welding process, wherein the face ends and the side of the lateral component oriented toward the plate stack are heated by means of radiation from a heat reflector, which is temporarily inserted between the lateral component and the plate stack spaced apart from each of them, until they reach melting temperature and then, after removal of the heat reflector, the lateral component and the face ends are pressed against each other until the material cools.

In this manner, a particularly high connection quality between lateral component and plate stack is combined with short manufacture times.

In a particular improvement of the invention, recesses are provided in the heat reflector which are for the positioning of the inlet and outlet openings of the positioning device in relation to the electrode compartments.

Therefore, the inlet and outlet openings are advantageously prevented from having to be machined ahead of time for purposes of further machining the battery.

According to a particular feature of the present invention, an electrochemical battery is provided, in particular a zinc-bromine battery, which has a nondetachable, fluid-tight, and gastight connection between a plate stack and a plate-shaped lateral component, and for spacing this plate stack, which is comprised of successive, thin-walled electrode plates with separator plates disposed between each of them; the lateral component is comprised of electrically non-conducting material. The nondetachable, fluid-tight, and gastight connection may be located between a respective face end of the plate stack and a side of the lateral component facing the respective face end and may be produced by attaining a melting temperature in each of the respective face end and the facing lateral component side and pressing the respective face end and the facing lateral component side together. The electrical non-conducting material may include a thermoplastic material having a chemical resistance to the predetermined electrolyte.

With this improvement according to the invention, it is possible to enormously lengthen the service life of batteries of the type mentioned. Moreover, adherence to the given specifications can be assured.

BRIEF DESCRIPTION OF THE DRAWING FIGURES

The present invention is further described in the detailed description which follows, in reference to the noted drawings by way of non-limiting examples of preferred embodiments of the present invention, and wherein.

DETAILED DESCRIPTION OF THE PREFERRED EMBODIMENTS

Figure 3:
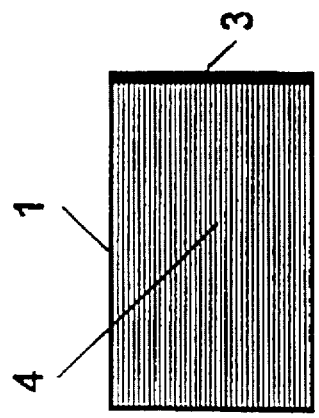
FIG. 3 illustrates a third phase in preparing a nondetachable, fluid-tight, and gastight connection between a plate stack and a lateral component.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing making apparent to those skilled in the art how the several forms of the invention may be embodied in practice.

Figure 2:
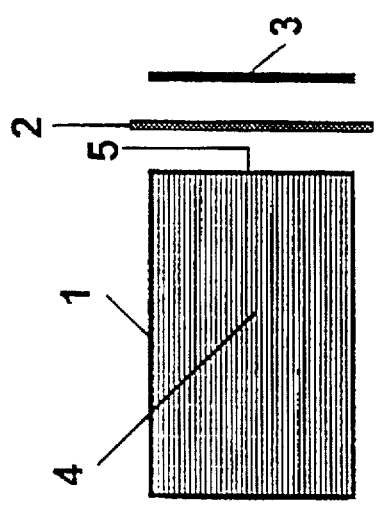
FIG. 2 illustrates a second phase in preparing a nondetachable, fluid-tight, and gastight connection between a plate stack and a lateral component.

The invention should be explained in detail in an exemplary embodiment and in fact in conjunction with a combined version in which a battery is connected to the plate stack by a joining and welding process, e.g., a heat reflector butt-welding process, including inserting a heat reflector between a respective end face and a facing lateral component side, maintaining a predetermined space between the heat reflector and the respective end face and between the heat reflector and the facing lateral component side, applying heat, by radiation, from the heat reflector until each of the respective end face and the facing lateral component side attain the melting temperature, removing the heat reflector, and pressing the respective end face and the facing lateral component against each other until cool. By means of three manufacture phases A, B, and C, the FIGS. 1, 2 and 3, respectively shows the principle of the invention, which allows it to produce a fluid-tight and gastight connection between the lateral component and the plate stack.

Figure 1:
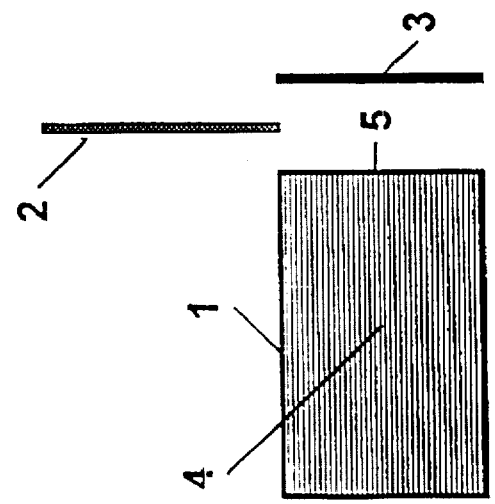
FIG. 1 illustrates a first phase in preparing a nondetachable, fluid-tight, and gastight connection between a plate stack and a lateral component.

As is clear from the FIG. 1, in manufacturing phase A, a plate stack 1, which is comprised of a large number of electrode plates and separator plates 4, is disposed spaced apart from and parallel to the face ends 5 of the plates 4 of the lateral component 3 according to the invention. A heat panel 2, whose heating is not yet switched on at this point, is disposed above the intermediary space of the lateral component 3 and the plate stack 1.

Manufacture phase B (FIG. 2) shows the lowered heat panel 2, which is already disposed spaced apart from and parallel to the lateral component 3 and to the plate stack 1—especially with regard to the face ends 5 of the electrode plates and separator plates 4. In this phase of manufacture, the heat panel is already switched on. The regions of the face end 5 of the electrode plates and separator plates 4 and likewise, the side of the lateral component 3 oriented toward the plate stack 1, is now heated by means of infrared radiation. The heating phase lasts only as long as it takes to melt a sufficient, thin layer of the surface of the lateral component 3 and of the region of the face ends 5. Then, the heat panel 2 is pulled up, the heating is switched off, and the melted surface layers of the lateral component 3 and the face ends 5 are pressed against each other. In particular embodiments of heat reflectors and affiliated reflector lowering devices, it is naturally also possible to carry out the manufacturing process without switching the heating on and off each time because of the relatively short cycle times.

Phase C (FIG. 3) of the manufacture shows the lateral component 3, which adheres to the face ends 5 of the plates 4 in a nondetachable, fluid-tight, and gastight manner. During the so-called joining time, which is made up of pressing time and cooling time, a connection of the thermoplastic parts has been produced in which most of the crystallinity has been preserved; this signifies a quality assurance for the mechanical stability, fluid-tightness, and gastightness of the connection produced.

What is claimed:

1. A method for producing a nondetachable, fluid-tight, and gastight connection between a plate stack and a lateral component of an electrochemical battery, and for spacing the plate stack, the plate stack comprised of successive, parallel planar electrode plates with separator plates disposed between each electrode plate, the lateral component comprised of electrically non-conducting material, the method comprising:

guiding the lateral component to a position spaced apart from and parallel to a respective face end of the electrode plates and separator plates of the plate stack;

simultaneously exposing the respective face end and a side of the lateral component positioned to face the respective face end to a temporary surface heating until each of the respective face and the facing lateral component side attain a melting temperature; and pressing the respective face and the lateral component against each other until cool.

2. The method for producing a nondetachable, fluid-tight, and gastight connection according to claim 1, the heating comprising a joining and welding process.

3. The method for producing a nondetachable, fluid-tight, and gastight connection according to claim 2, the heating comprising a heat panel butt-welding process including:

inserting a heat panel between the respective face end and the facing lateral component side;

pressing the respective face end and the facing lateral component side against the heat panel until each of the respective face end and the facing lateral component side attain the melting temperature;

removing the heat panel; and pressing the facing lateral component side and the respective face end against each other until cool.

4. The method for producing a nondetachable, fluid-tight, and gastight connection according to claim 2, the joining and welding process comprising a heat panel butt-welding process comprising:

inserting a heat panel between the respective end face and the facing lateral component side;

maintaining a space between the heat panel and the respective end face and between the heat panel and the facing lateral component side;

applying heat, by radiation, from the heat panel until each of the respective end face and the facing lateral component side attain the melting temperature;

removing the heat panel; and pressing the respective end face and the facing lateral component against each other until cool.

5. The method for producing a nondetachable, fluid-tight, and gastight connection according to claim the method further comprising:

providing recesses in the heat panel for positioning the inlet and outlet openings of a positioning device in relation to electrode compartments.

6. An electrochemical battery comprising:

an electrolyte;

a nondetachable, fluid-tight, and gastight connection between a plate stack, comprising successive, parallel planar electrode plates with separator plates disposed between each planar electrode plate, and a plate-shaped lateral component, comprising electrically non-conducting material, the nondetachable, fluid-tight, and gastight connection located between a respective face end of the plate stack and a side of the lateral component facing the respective face end and produced by attaining a melting temperature in each of the respective face end and the facing lateral component side and pressing the respective face end and the facing lateral component side together; the electrical non-conducting material including a thermoplastic material having a chemical resistance to the electrolyte.

7. The electrochemical battery according to claim 6, said electrolyte comprising zinc-bromine.

* * * * *